United States Patent
Sato

(10) Patent No.: US 7,111,026 B2
(45) Date of Patent: Sep. 19, 2006

(54) METHOD AND DEVICE FOR ACQUIRING SNAPSHOTS AND COMPUTER SYSTEM WITH SNAPSHOT ACQUIRING FUNCTION

(75) Inventor: Eiichi Sato, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 10/837,598

(22) Filed: May 4, 2004

(65) Prior Publication Data

US 2005/0187982 A1   Aug. 25, 2005

(30) Foreign Application Priority Data

Feb. 23, 2004 (JP) .............................. 2004-045981

(51) Int. Cl.
   *G06F 17/30* (2006.01)
(52) U.S. Cl. ..................................... 707/203
(58) Field of Classification Search .............. 707/1–10, 707/100–104.1, 200–206; 709/219, 217; 711/112, 162; 714/2, 6; 370/352
   See application file for complete search history.

(56) References Cited

U.S. PATENT DOCUMENTS

| | | | |
|---|---|---|---|
| 6,076,148 A | 6/2000 | Kedem | 711/162 |
| 6,397,229 B1 | 5/2002 | Menon et al. | 707/204 |
| 6,594,744 B1 | 7/2003 | Humlicek et al. | 711/162 |
| 6,604,118 B1 | 8/2003 | Kleiman et al. | 707/203 |
| 6,678,809 B1 * | 1/2004 | Delaney et al. | 711/162 |
| 6,799,189 B1 | 9/2004 | Huxoll | 707/204 |
| 2002/0064149 A1 * | 5/2002 | Elliott et al. | 370/352 |
| 2002/0133512 A1 | 9/2002 | Mililo et al. | 707/204 |
| 2003/0101321 A1 | 5/2003 | Ohran | 711/162 |
| 2003/0208511 A1 | 11/2003 | Earl et al. | 707/204 |
| 2003/0221075 A1 | 11/2003 | Achiwa et al. | 711/162 |
| 2004/0024845 A1 * | 2/2004 | Fishhaut et al. | 709/219 |
| 2004/0044744 A1 * | 3/2004 | Grosner et al. | 709/217 |
| 2004/0117572 A1 | 6/2004 | Welsh et al. | 711/162 |
| 2004/0250029 A1 * | 12/2004 | Ji et al. | 711/162 |

FOREIGN PATENT DOCUMENTS

JP       2002-278819       9/2002

* cited by examiner

*Primary Examiner*—Diane Mizrahi
(74) *Attorney, Agent, or Firm*—Mattingly, Stanger, Malur & Brundidge, P.C.

(57) ABSTRACT

To eliminate unnecessary generational management, a device to be snapshot and a snapshot control device capable of controlling snapshot commands are connected to a storage system connected to a server provided with a snapshot operating section. The storage system has a differential data storage area for the purpose of generational management of differential data in the device to be snapshot. A snapshot command control section carries out command processing upon receiving snapshot control command issue requests from the server. A designated snapshot update volume managing section manages the update differential volume for snapshot processing, compares a previously designated update volume and an actual update volume, and implements processing for provisional generational management of the update differential in accordance with the designated update volume. A designated snapshot volume reporting section reports management status and processing results to the server in accordance with management of the update differential volume and generational management.

18 Claims, 12 Drawing Sheets

FIG.11

MANAGEMENT TABLE 1

| DESIGNATED UPDATE VOLUME | UPDATE VOLUME BEING PROCESSED | GENERATION NUMBER BEING PROCESSED | NUMBER OF PROVISIONAL GENERATIONS |
|---|---|---|---|
| X | Y | n+2 | m |

MANAGEMENT TABLE 2

| GENERATIONAL MANAGEMENT | STATUS | VOLUME MANAGEMENT |
|---|---|---|
| GENERATION 1 | COMPLETED | X |
| GENERATION 2 | COMPLETED | X |
| GENERATION 3 | COMPLETED | X+20 |
| ⋮ | | |
| GENERATION (n-1) | COMPLETED | X+10 |
| GENERATION n | PROVISIONAL | X |
| GENERATION (n+1) | PROVISIONAL | X |
| GENERATION (n+2) | BEING PROCESSED | Y-(m-1)*X |
| GENERATION (n+3) | NOT PROCESSED | — |

DETAILS OF STATUS INDICATORS: COMPLETED → SNAPSHOT PROCESSING COMPLETED (ESTABLISHED)
PROVISIONAL → EXCEEDS DESIGNATED UPDATE VOLUME; PROVISIONAL GENERATION MANAGEMENT
BEING PROCESSED → GENERATION CURRENTLY BEING PROCESSED
NOT PROCESSED → NOT YET PROCESSED (EMPTY)

METHOD AND DEVICE FOR ACQUIRING SNAPSHOTS AND COMPUTER SYSTEM WITH SNAPSHOT ACQUIRING FUNCTION

CROSS-REFERENCES TO RELATED APPLICATIONS

This application relates to and claims priority from Japanese Patent Application No. 2004-045981, filed on Feb. 23, 2004, the entire disclosure of which is incorporated herein by reference.

BACKGROUND OF THE INVENTION

The present invention relates to a computer system; and, more particularly, the invention relates to a method and device for acquiring snapshot data in a storage system for receiving data from an information processing system and for controlling the writing and reading of data to and from a plurality of storage devices, and to a computer system provided with a snapshot acquiring function of this kind.

A computer system is constituted by one or a plurality of information processing devices (hereinafter, also called servers), a data storage system (hereinafter, also called a storage system) for writing or reading data by means of requests from the servers, and various networks connecting these various elements together. In a storage system of this kind, in order to be able to restore the original data from the start of a time period to replace the data updated during that time period, with respect to at least two or more time periods, data (generational data) divided up for each of the respective time intervals is acquired as a snapshot. Specifically, in order to restore the data of a previous time period prior to the time period in which the data has been updated (to restore data of a previous generation), snapshot processing is carried out with respect to the data of the previous time period prior to the data (current generation data) of the time period in which the data is updated by an updating command; and, hence, the data of this time period is acquired as snapshot data and is saved. The data acquired as a snapshot is stored in a prescribed data storage region, in the form of a change (differential data) between the update time period and the time period prior to update, in the same sequence as the time intervals for which the snapshots are acquired, in other words, in a generational order. Patent Japanese Patent Laid-open No. 2002-278819, for example, discloses a method for managing the generation of snapshot data.

SUMMARY OF THE INVENTION

However, if the volume of data updated on the device from which snapshot data is acquired, namely, a disk device (also referred to as a hard disk), is generally small, then the volume of snapshot data updated in that time period will also be small, and, hence, generational data (differential data) will be managed which is rarely used in practice. Particularly, in the case of a system where snapshots are acquired at frequent intervals, or where there is a limit on the number of generations that can be managed, then in present day systems, it is impossible to avoid managing unnecessary generational data which has little probability of being used.

The present invention principally comprises, in addition to snapshot acquiring means as generally implemented at present: means for designating an update volume for setting data as valid for snapshot data; means for judging whether or not snapshot data is to be acquired, by comparing the update volume of the data actually updated by the device to which snapshot processing is applied with the designated update volume; and means for assigning a provisional generation and performing generational management that is effective for restoration of data of prescribed generations, if the actual update volume exceeds the designated update volume.

The update volume for acquiring snapshot data is previously designated, in order that the data managed as differential data acquired in snapshot processing (the change in the data before and after updating in the current time period) is respectively used to the maximum effect, and unnecessary management of generations of data is not carried out. It is judged whether or not a data update reaching a designated update volume specified by the user via the system has been carried out in the device to which snapshot processing is applied, and if the data update does reach this volume, then snapshot data is acquired and set as an object for generational management, whereas if the data update does not reach this volume, then no processing is implemented and the data update is not set as an object for generational management, or alternatively, it is incorporated into the preceding generation. According to the present invention, it is possible to make effective use of each generation of data acquired by implementing snapshot processing in accordance with a designated update volume, and it is also possible to eliminate unnecessary generational management, in addition to which the use value of the data acquired by snapshot processing, per generation, is increased, and unnecessary generation of data to be managed can be eliminated.

BRIEF DESCRIPTION OF THE DRAWINGS

FIG. 11 is a diagram showing the management items in the designated snapshot update volume managing section;

DESCRIPTION OF THE PREFERRED EMBODIMENTS

Figure 1:
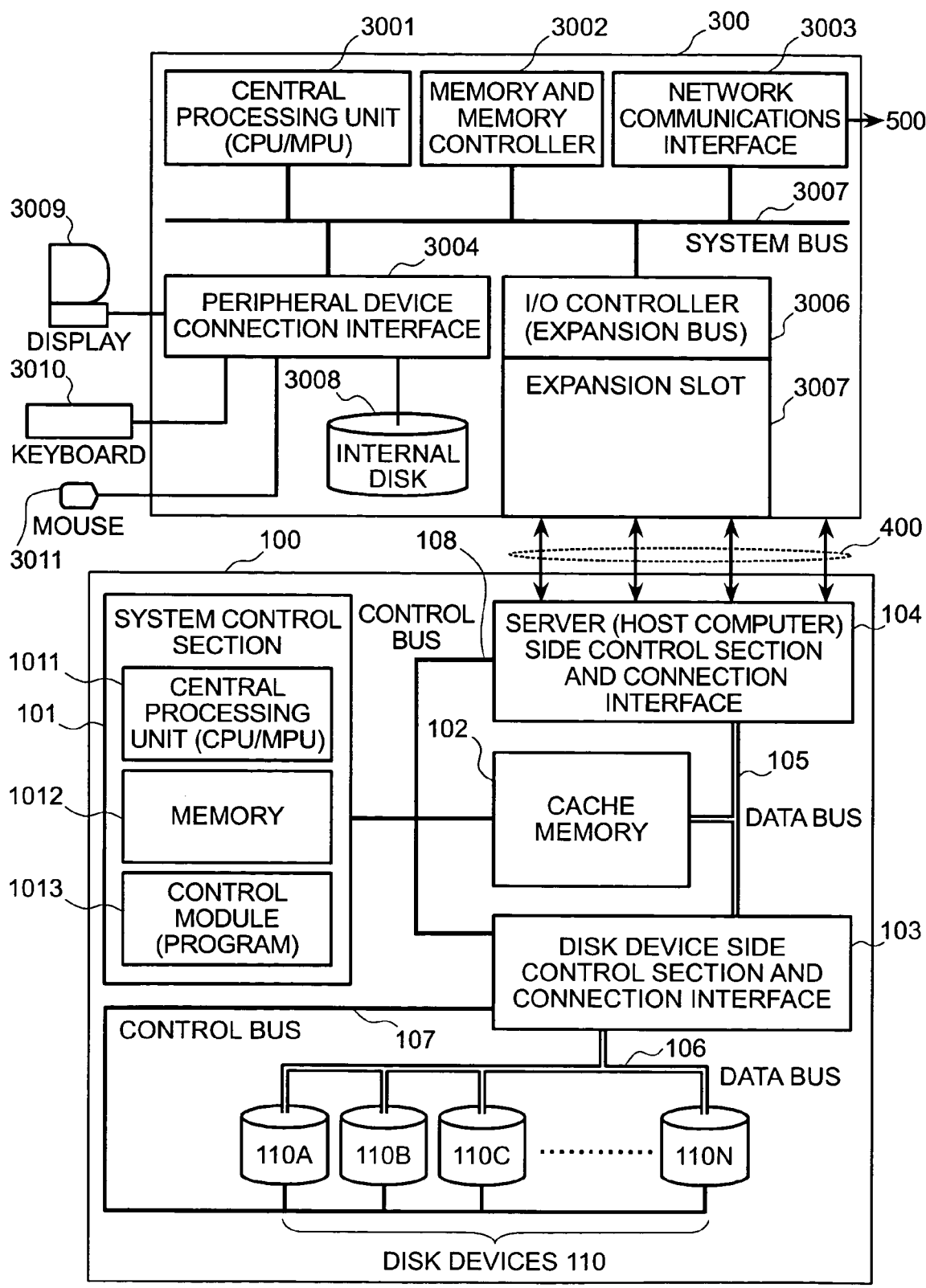
FIG. 1 is a block diagram of one example showing a computer system to which the present invention is applied.

FIG. 1 is a diagram which shows one example of a computer system to which the present invention is applied. Reference numeral 100 in FIG. 1 denotes a storage system, and reference numeral 300 denotes a server (host computer), which is an information processing device (hereinafter, called a server) that writes and reads to and from a disk device 110 by communicating with the storage system 100. The storage system 100 and the server 300 are connected, for example, by a communications circuit 400, such as a SAN (Storage Area Network), or the like. The server 300 comprises a central processing unit (CPU or MPU) 3001, a memory and memory controller 3002, a network communications interface 3003, a peripheral device connection interface 3004, an expansion bus 3006 forming an input/output (I/O) controller, an expansion slot 3007, an internal disk 3008 and a system bus 3007.

The network communications interface 3003 connects the server 300 to a communications circuit 500, such as a dedicated circuit or a public circuit, which connects to a remote computer system. The peripheral device connection interface 3004 connects to a display 3009, a keyboard 3010, a mouse 3011, and the like, which form a user interface. Moreover, the peripheral device connection interface 3004 is also connected to the internal disk 3008.

The storage system 100 is constituted by a system control section 101, a cache memory 102, a disk device side control section and connection interface 103, a server side control section and connection interface 104, a disk device 110, and data buses 105, 106 and control buses 107, 108 for connecting the same. The system control section 101 comprises a central processing unit (CPU or MPU) 1011, a memory 1012, and a control module (program and control program storage section) 1013. The disk device 110 is constituted by a plurality of disk devices 110A, 110B, 110C, . . . 110N.

Figure 2:
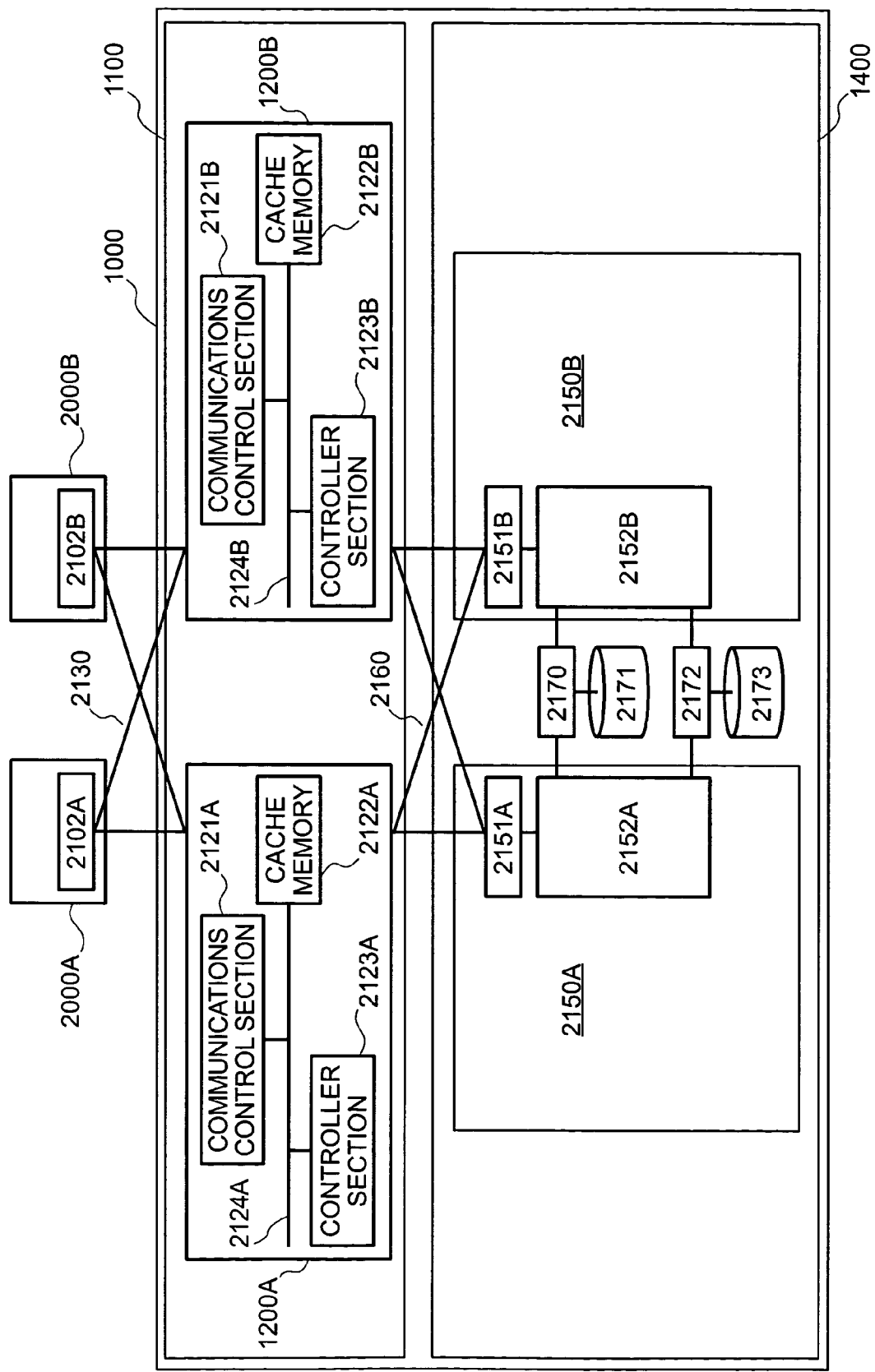
FIG. 2 is a block diagram showing a further example of a computer system to which the present invention is applied.

FIG. 2 is a diagram showing a further example of a computer system to which the present invention is applied. This computer system comprises a storage sub-system 1000 connected to servers 2000A and 2000VB. This storage sub-system 1000 is constituted by a base frame body 1100 and an add-on frame body 1400. The base frame body 1100 comprises two system controllers 1200A and 1200B for controlling the add-on frame body 1400. These system controllers 1200A, 1200B are so-called RAID (Redundant Arrays of Inexpensive Disks) controllers.

In this example, the base frame body 110 is connected to the servers 2000A, 2000B which are top-level devices in a SAN (Storage Area Network) 2130. The servers 2000A, 2000B comprise host adapters 102A, 102B. The host adapters 102A, 102B are FC (Fiber Channel)/SCSI interface boards. The base frame body 110 and the add-on frame body 140 are connected by a back-end FC loop 2160.

The add-on frame body 1400 is also called a drive frame, and although only one of the same is illustrated here, generally, in practice, a plurality are provided. The add-on frame body 1400 comprises disk devices 2171, 2173, which are SATA drives (Serial ATA) drives. A two-layer drive controller comprising a first drive controller 2150A and a second drive controller 2150B is provided for the disk devices 2171, 2173. The first drive controller 2150A is a controller for the add-on frame body 1400, and it comprises a first port bypass circuit 2151A and a first interface connection device 2152A.

The SATA drive is constituted by the disk devices 2171, 2173, and dual port devices (DPD) 2170, 2172. The dual-port devices DPD 2170, 2172 have the function of switching the access path of the disk devices 2171, 2173 between the first interface connection device 2152A of the first drive controller 2150A, and the second interface connection device 2152B of the second drive controller 2150B. More specifically, they have the function of connecting the data line from either the first interface connection device 2152A of the first drive controller 2150A or the second interface connection device 2152B of the second drive controller 2150B, to the disk devices 2171, 2173.

The first port bypass circuit 2151A and the second port bypass circuit 2151B are circuits for switching the route of the path (data line); and, rather than executing path switching of their own accord, they switch the path in accordance with instructions from the system controllers 1200A, 1200B.

The system controller 1200A shown in FIG. 2 comprises a communications control device 2121A having an interface for communicating with the host computers 2000A, 2000B, and a cache memory 2122A for temporarily storing data exchanged between the communications control device 2121A and the controller section 2123A. Reference numeral 2124A lo denotes a data bus. The controller section 2123A executes writing and reading of data, to and from the drive (disk device), via the cache memory 2122A, by means of data input/output requests from the communications control device 2121A. The composition of the system controller 2120B can also be described similarly, by substituting the suffix "B" for "A" in the foregoing reference numerals.

The present invention provides a method and a device for acquiring snapshots which are applicable to a storage system (disk device) in one of the various computer systems described above, and the present invention will be described in more detail below by reference to various embodiments.

Figure 3:
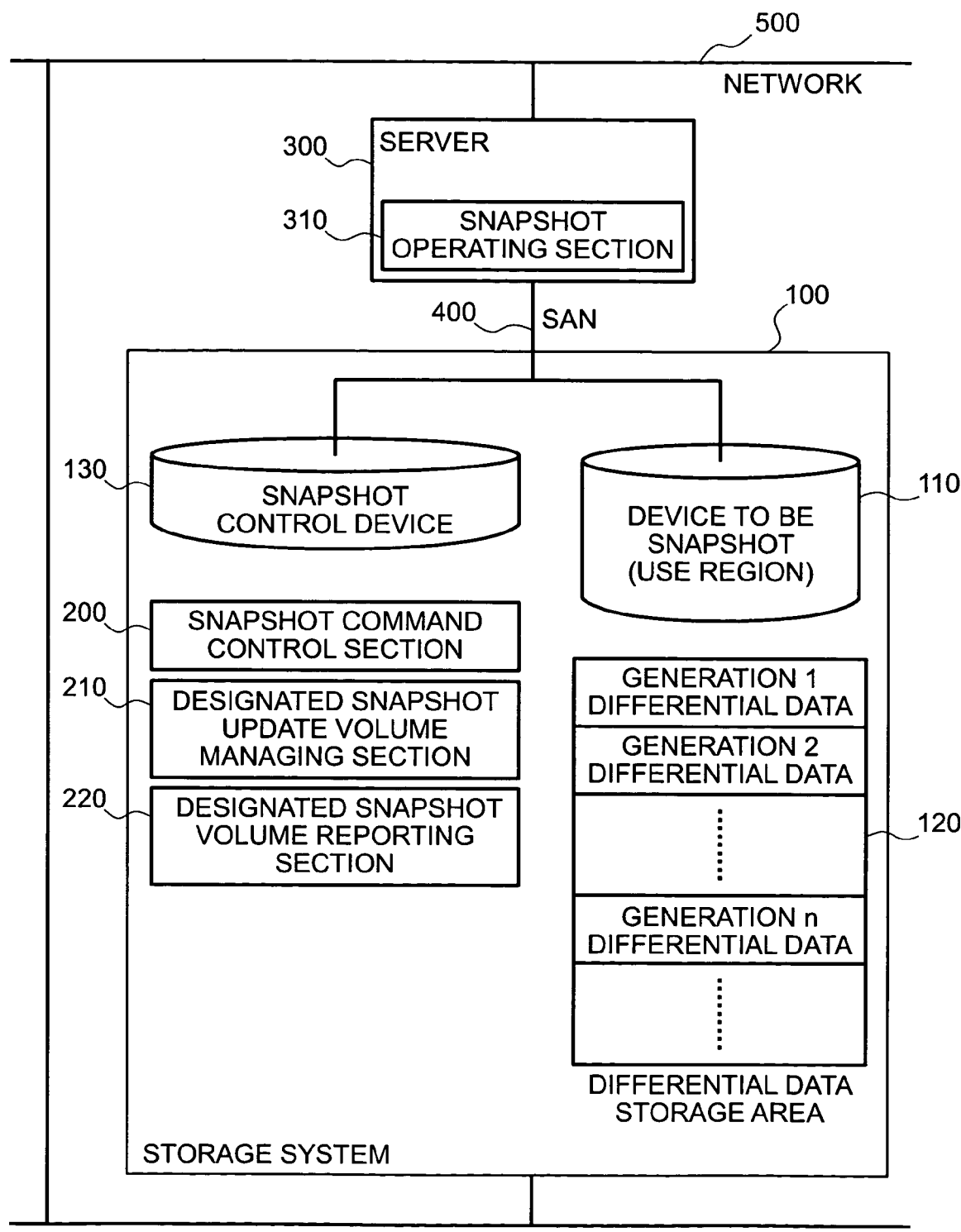
FIG. 3 is a block diagram which shows the system composition of a snapshot acquiring device a first embodiment of the present invention.

FIG. 3 shows the system composition of a snapshot acquiring device representing a first embodiment of the present invention. In FIG. 3, the storage system 100 is connected to the server 300 by means of a connection interface 400. The connection interface 400 may employ various modes of connection between the server and the storage system, for instance, SCSI, fiber channel (FC), or SAN (Storage Area Network). The server 300 is connected to a device to be snapshot 110 (here, a disk device), which is a region in actual use inside the storage system 100, and to a snapshot control device 130, which is capable of controlling snapshot commands. Moreover, in the illustration in FIG. 3, the server 300 and the storage system 100 are connected by means of a network 500.

As shown in the drawings, in the composition of the present embodiment, both a snapshot control device 130 and a network 500 are provided as communication routes for issuing commands to the server 300 and the storage system 100 and reporting processing results; however, but it is not absolutely necessary to have both communications routes, and the present invention may also be implemented by providing any one of these communications routes.

The storage system 100 has a differential data storage area 120 for managing the generation of differential data in the device to be snapshot 110, this differential data storage area 120 being provided either in the device to be snapshot 110, or in the snapshot control device 130, or in a separate disk device (not illustrated). In the following description, this area may be referred to as a region. This differential data is data relating to the difference (after updating) in other words, the change, between data of the time period in which the snapshot command was issued (updated data) and data of the time period prior to this time period (data prior to update). Below, the respective time periods for which snapshot data is acquired are also referred to as generations, the management of the differential data acquired at these time periods is referred to as generational management, and the storage region for the differential data acquired by taking a snapshot is also referred to as the section for storing generational management data.

Moreover, in order to provide functions for achieving the present invention, there are provided: a snapshot command control section 200, having the function of implementing command processing upon receiving a snapshot control command issue request from a server; a designated snapshot update volume managing section 210, having the function of carrying out processing, such as managing the volume of the snapshot update differential, comparing the actual update volume with a previously specified update volume and judging the same, and performing provisional generational management of the update differential, in accordance with the specified update volume; and a designated snapshot volume reporting section 220, having the function of reporting the management status and the processing results to the server side, as and when necessary, in accordance with the management of the update differential volume and the generational management.

Figure 4:
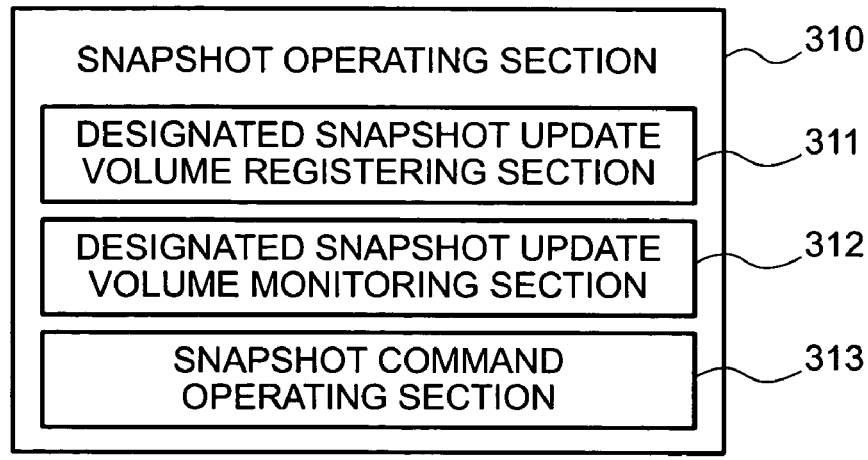
FIG. 4 is a diagram illustrating the details of a snapshot operating section in FIG. 3.

FIG. 4 is a diagram illustrating the details of a snapshot operating section in FIG. 3. The actual snapshot processing request is executed by a snapshot operating function 310 in the server 300. As shown in FIG. 4, the snapshot operating function 310 is constituted by a designated snapshot update volume registering section 311, having the function of establishing the update differential volume that is to be handled by the snapshot management operation; a designated snapshot update volume monitoring section 312, having the function of receiving the management status according to the present embodiment of a storage system, as a report from the storage system; and a snapshot command operating section 313, having the function of outputting the actual snapshot processing request to the storage system.

Figure 5:
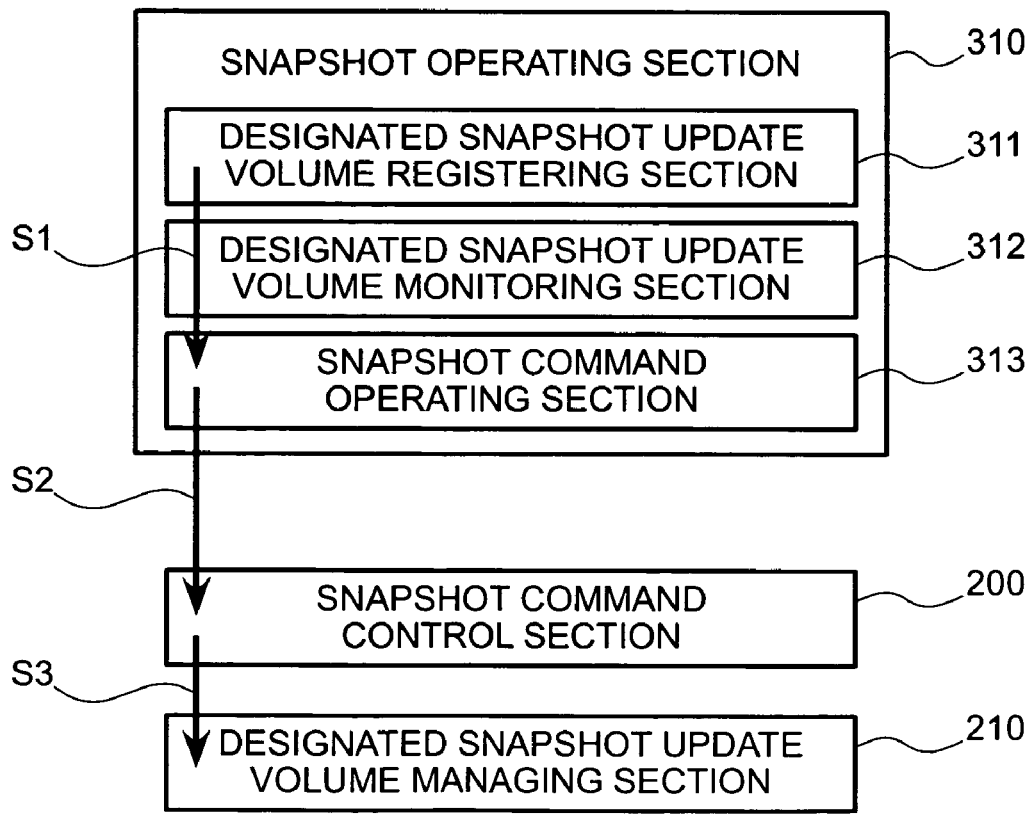
FIG. 5 is a diagram showing the sequence of processing implemented by the snapshot operating system in the snapshot processing according to the first embodiment of the present invention.

FIG. 5 is a diagram showing the sequence of processing implemented by the snapshot operating system in the snapshot processing according to the first embodiment of the present invention. When executing snapshot processing, firstly, the update differential volume that is regarded to be valid for snapshot processing is registered. The value set here is the designated update volume to be described hereinafter. Firstly, the user sets the size of the snapshot update volume, from the server, by means of the designated snapshot update volume registering section 311. When the snapshot update volume is set by the designated snapshot update volume registering section 311, the designated snapshot update volume registering section 311 requests registration of the update volume, using the set value, to the snapshot command operating section 313 (Step S1). In other words, if the user specifies an update volume, from the server side, via the designated snapshot update volume registering section 311 of the snapshot command operating section 310, then the designated snapshot update volume registering section 311 requests the snapshot command operating section 313 to issue a volume setting command.

The snapshot command operating section 313 issues a registration processing request to the snapshot command control section 200 via the communications path between the server 300 and the storage system 100 illustrated in FIG. 3 (step S2). In other words, upon receiving a request for issue of a volume setting command, the snapshot command operating section 313 issues a volume setting command to the snapshot control section 200 of the storage system.

Upon receiving this registration request, the snapshot command control section 200 reports the registration request to the designated snapshot update volume managing section 210, whereby registration is completed (step S3). More specifically, the snapshot command control section 200 of the storage system reports the received command to the designated snapshot update volume managing section 210. The designated snapshot update volume managing section 210 registers the specified volume and manages this volume.

Thereby, the preparation for snapshot processing according to the first embodiment is completed.

Figure 6:
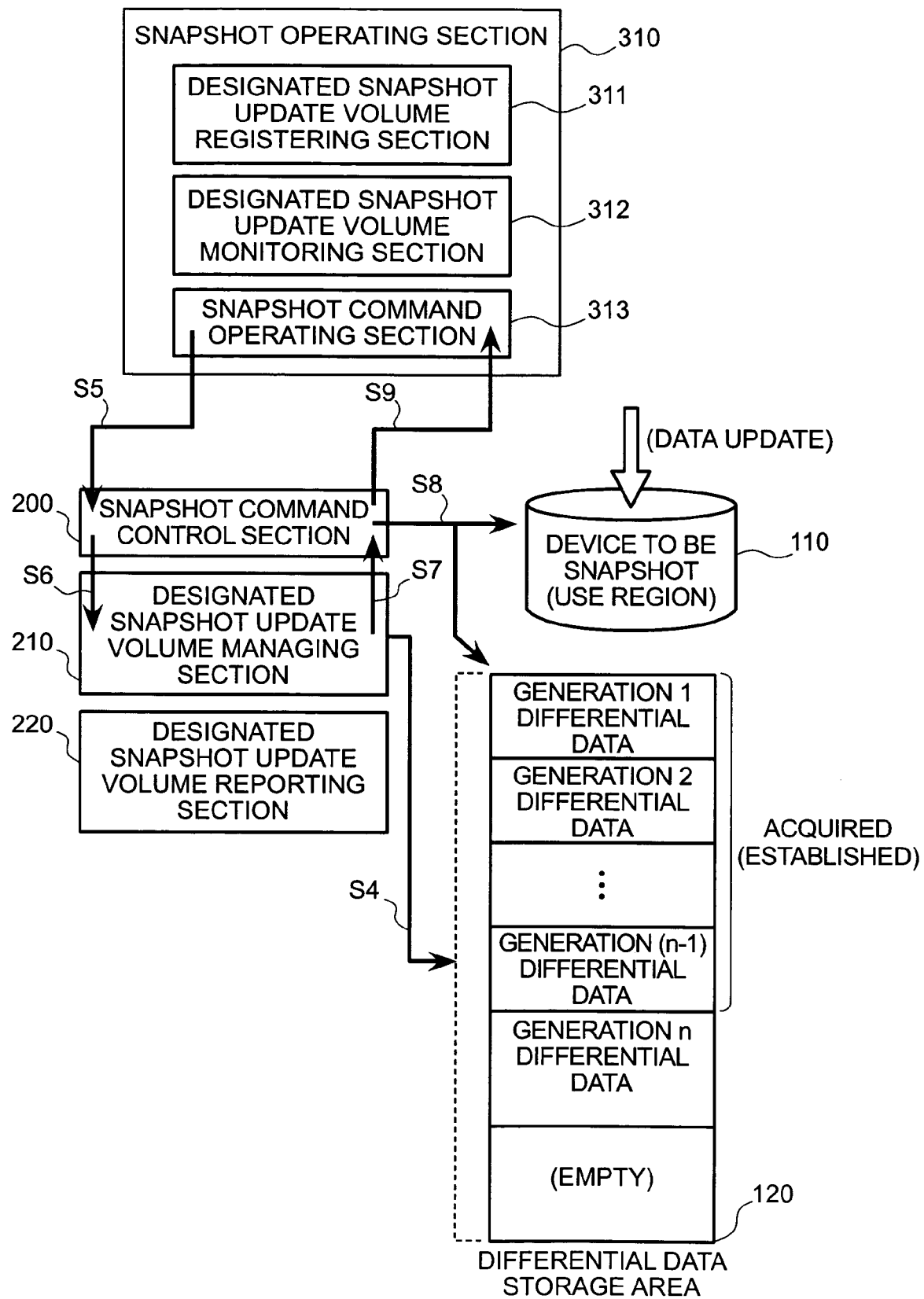
FIG. 6 is a diagram showing the sequence of basic processing for acquiring a snapshot in the snapshot processing according to the first embodiment of the present invention.

FIG. 6 is a diagram showing the sequence of basic processing for acquiring a snapshot that occurs in the snapshot processing according to the first embodiment of the present invention. When the preparations for snapshot processing described above have been completed, the processing sequence illustrated in FIG. 6 is followed. The example in FIG. 6 shows a hypothetical state in which snapshot data (differential data) up to generation (n−1) has already been acquired, with respect to a certain number n (n time periods, in other words n generations, numbering two or more), and in which the snapshot data for the nth generation will be acquired at the next snapshot command issued. In a state of this kind, data updating is carried out by accessing the device (disk device) to be snapshot, and the update differential is managed by the designated snapshot update volume managing section 210 in the differential data storage area 120, as the differential data for the nth generation (step S4). In monitoring the status of the differential data in step S4, the size of the update volume is also managed, and it is compared with the designated update volume that was registered previously.

If the user issues a snapshot processing execution command, from the server 300, via the snapshot command operating section 313, then this processing request is transferred to the snapshot command control function 200 in the storage sub-system 100 (step S5: execute snapshot (issue command)).

The snapshot command control section 200 receives this command and confirms the management status of the current snapshot data in the designated snapshot update volume managing section 210 (step S6: receive snapshot command and confirm status of differential data).

The designated snapshot update volume managing section 210 judges whether or not the volume of data actually updated has reached the designated update volume of the generation currently being managed, and it returns this judgment result to the snapshot command control section 200 (step S7: report result of differential data confirmation).

The snapshot command control section 200 implements processing of the nth generation snapshot, in accordance with the judgment results received from the designated snapshot update volume managing section 210, if the condition is fulfilled that the actual update volume is equal to or greater than the designated update volume (step S8: execute snapshot processing, if update volume of differential data has reached designated volume, and do not execute processing, if it does not reach the designated volume (skip)). In other words, if it is judged that the actual volume of updated data does not reach the designated update volume, then step S8 is skipped and no processing is carried out. A processing result indicating whether processing was actually executed or not executed is reported to the snapshot command operating section 313 of the server 300 as a command return value (step S9: report processing result as return value for issued command).

Figure 7:
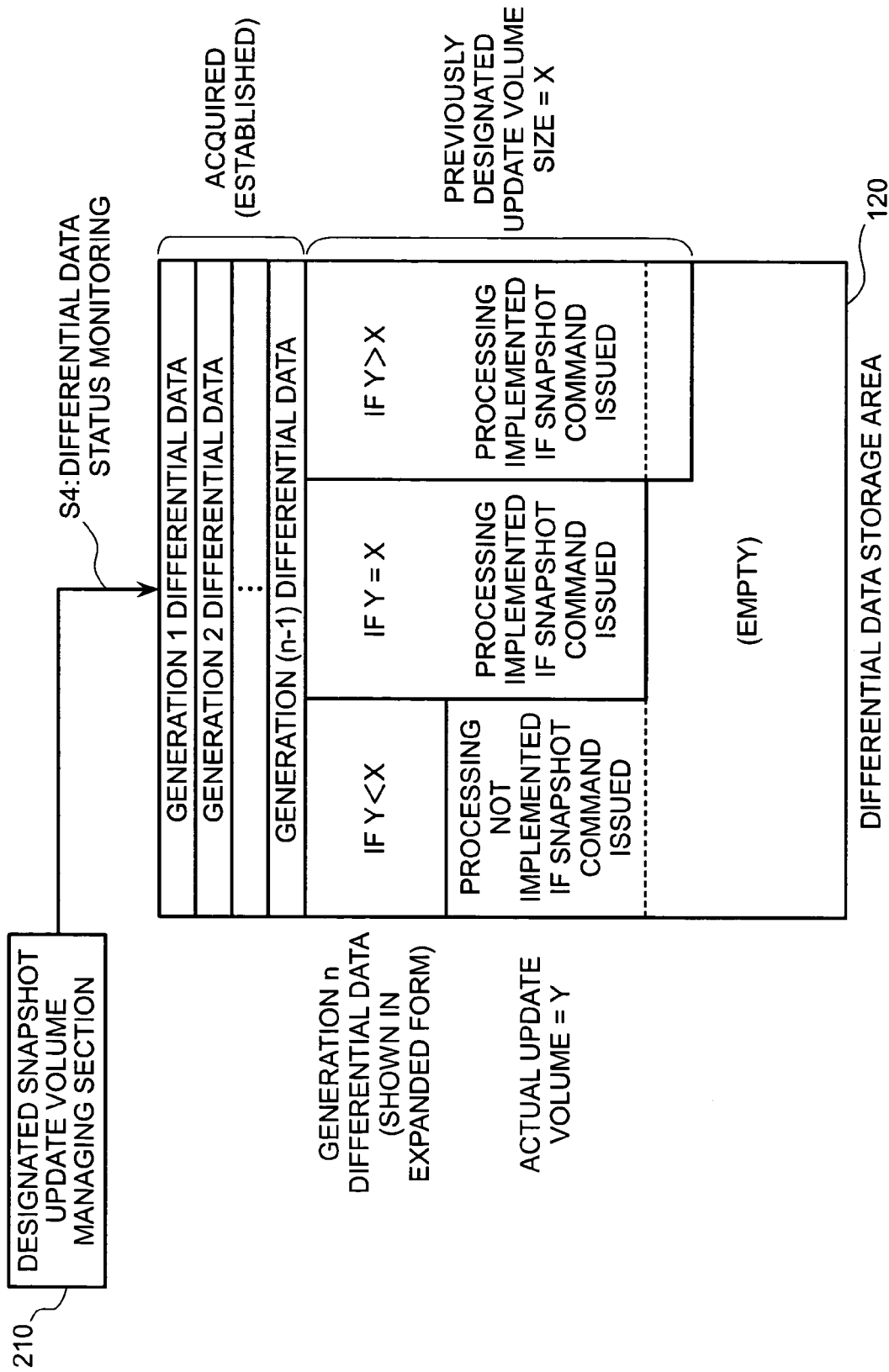
FIG. 7 is a diagram which shows a more detailed example of the management concept whereby the designated snapshot update volume managing section judges whether or not to execute snapshot processing.
Figure 8:
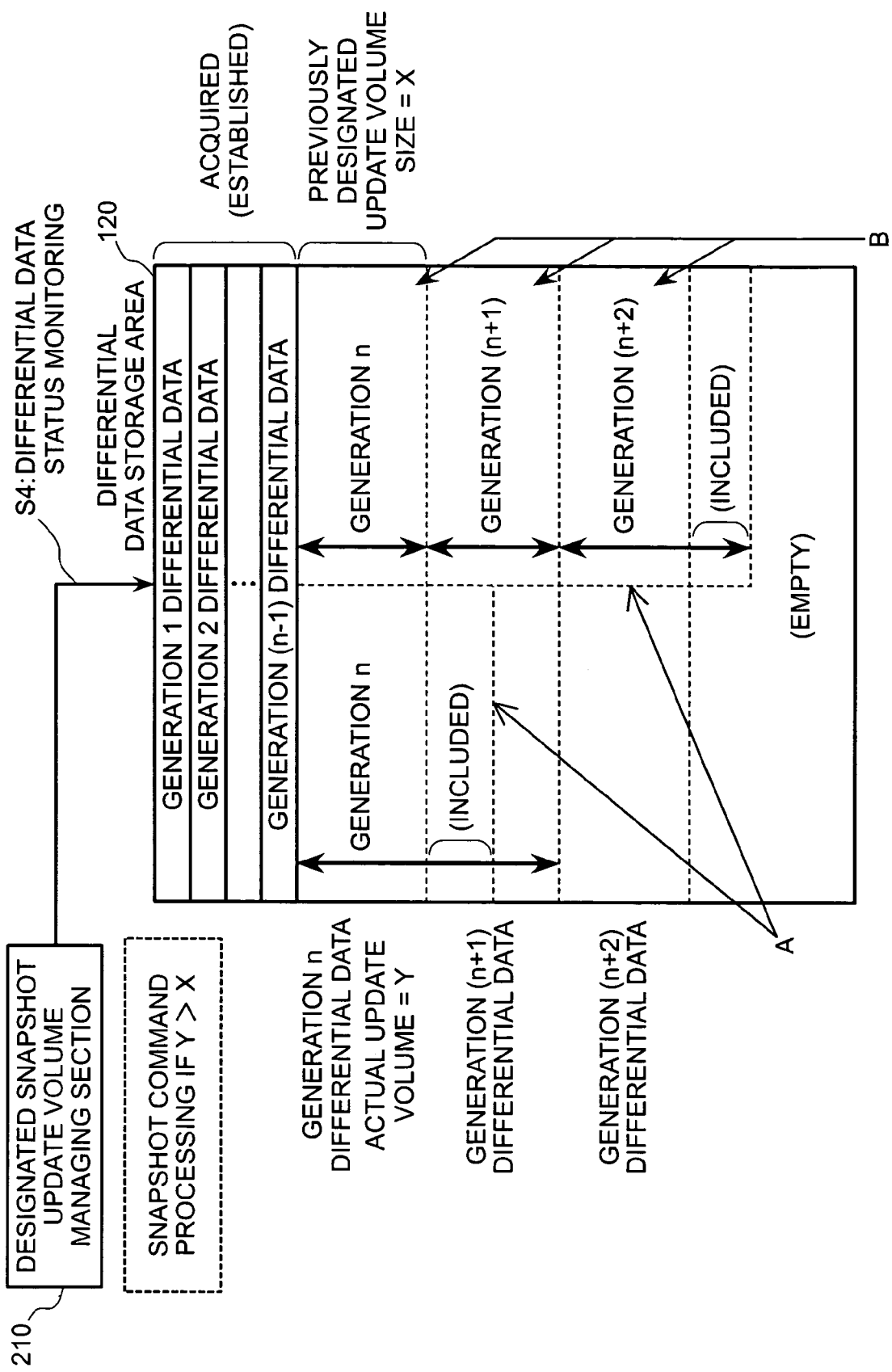
FIG. 8 is a diagram which shows a further, more detailed example of the management concept whereby the designated snapshot update volume managing section judges whether or not to execute snapshot processing.

FIG. 7 shows a more detailed example of the management concept whereby the designated snapshot update volume managing section 210 judges whether or not to execute snapshot processing. Moreover, FIG. 8 shows a further more detailed example of the management concept whereby the designated snapshot update volume managing section 210 judges whether or not to execute snapshot processing. As shown in FIG. 7, when processing nth generation snapshot data, for example, if the designated update volume is X and the actual update volume is Y, and if Y is less than X, then the update volume does not reach an update differential volume regarded to be valid for the snapshot processing specified by the user, and, therefore, snapshot processing is not executed.

If Y is equal to or greater than X, then firstly, if Y and X are the same, the update volume reaches an update differential volume that is regarded as valid for the snapshot processing specified by the user, and, hence, snapshot processing is carried out. If Y is greater than X, then the two patterns illustrated in FIG. 8 are possible. The first pattern relates to a case where Y exceeds X by the volume corresponding to a single generation, but it does not exceed the update volume of the next generation, and, in this case, at the moment that it exceeds X, snapshot data having an update volume corresponding to the designated update volume X is assigned provisionally to a generation, and the excess update data is regarded provisionally as the next generation. However, in actual snapshot processing, the excess portion of the update differential is also included in the same generation.

The example in FIG. 8 also shows a case where the actual update volume corresponding to snapshot management for the nth generation extends until the volume corresponding to the (n+1)th generation, and this portion of update data, that exceeds the update volume for the nth generation, is also included in the nth generation.

More specifically, as indicated by the arrow A in FIG. 8, if an update differential arises which exceeds the volume for one generation, but whose excess does not exceed X, then snapshot processing is carried out, wherein the excess portion is included in the generation in question. Moreover, if an update differential arises with spans a plurality of generations, with respect to the designated update volume X, then an update differential comprising an excess which does not exceed X is included with the previous update differential, and the update data for a plurality of generations is processed together in one operation.

The second pattern relates to a case where the actual update volume Y generates a plurality of generations, from the viewpoint of data volume, in terms of the designated update volume X; and, in this case, a generation is assigned provisionally to the snapshot data each time the data volume exceeds X, and the processing then advances to the next generation. When carrying out snapshot processing, the other generations, including the generation prior to the generation which does not exceed the designated update volume X, are established as snapshots having the designated update volume X, and the snapshot data for this plurality of generations is acquired together, in one operation.

More specifically, as indicated by the arrows B in FIG. 8, when an update differential that is equal to the designated update volume has arisen, a check point is established in the internal process, the data is assigned to a provisional generation, and the differential volume management region of the next generation is then assigned.

Figure 9:
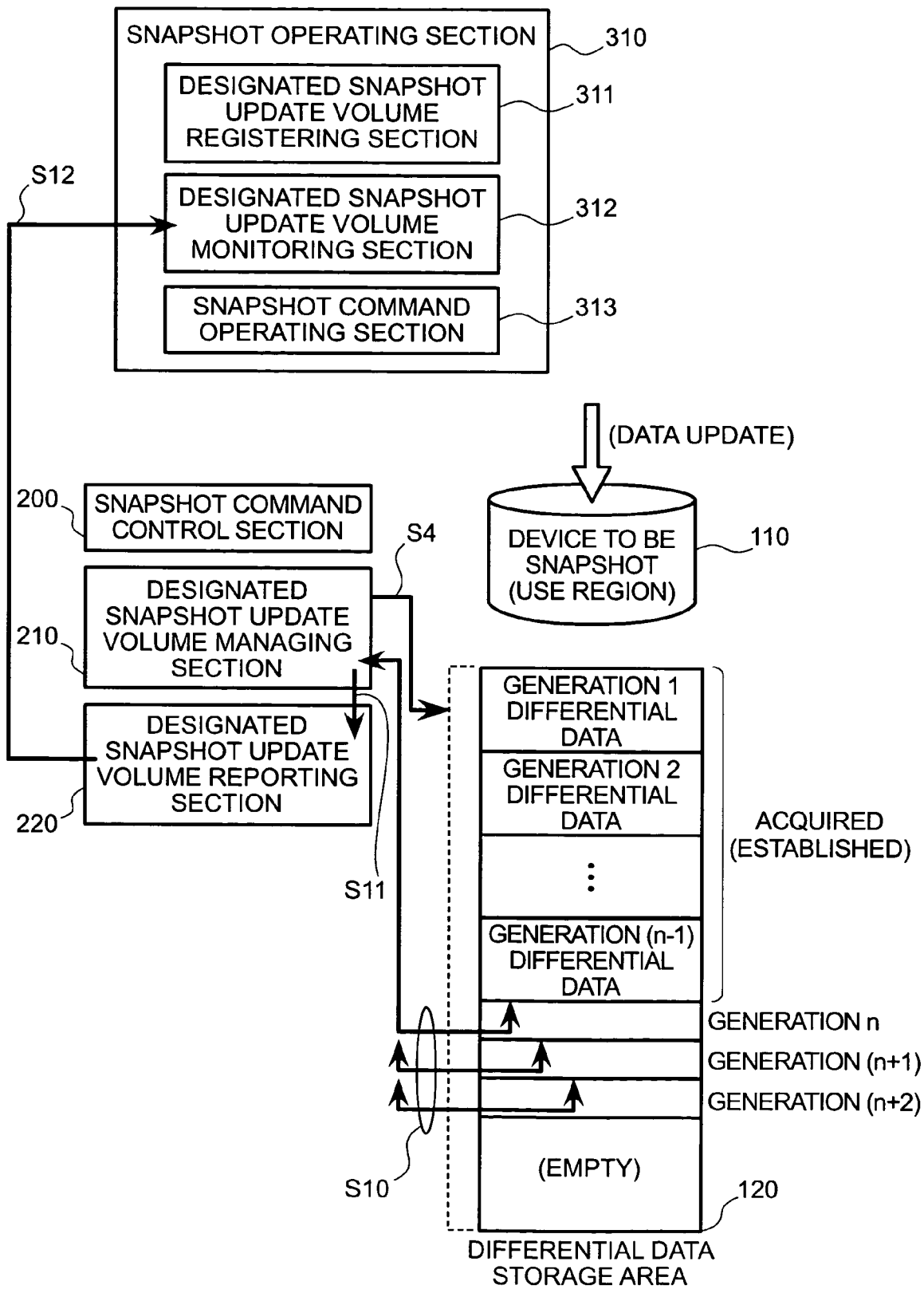
FIG. 9 is a diagram showing report processing in a case where the designated update differential has been exceeded.

FIG. 9 is a diagram showing report processing in a case where the designated update differential has been exceeded. A notification is sent to the server 300 indicating that it will be possible to acquire valid snapshot data, if snapshot processing is carried out, even in the case of a state wherein, as shown in FIG. 8, the update differential volume exceeds the designated update volume, and, hence, snapshot processing is effectively enabled on the user side.

As shown in FIG. 9, as a result of the designated snapshot update volume managing section 210 monitoring the status of the differential data storage area 120 in step S4 (monitor status of differential data), if the actual update volume is found to exceed the designated update volume, then the designated snapshot update volume managing section 210 carries out processing for provisional generation assignment and setting up of the next generation (step S10).

In other words, at step S10, if the designated update volume has been exceeded, then the designated snapshot update volume managing section 210 assigns a provisional generation and a check point.

Moreover, the designated snapshot update volume managing section 210 requests the designated snapshot volume reporting section 220 to carry out processing for reporting that the actual update volume has exceeded the designated update volume (step S11). Upon receiving this request, the designated snapshot volume reporting section 220 sends a report to the designated snapshot update volume monitoring section 312 in the server 300 (step S12). Thereby, the server 300 is able to know the processing status existing on the storage sub-system 100 side.

Figure 10:
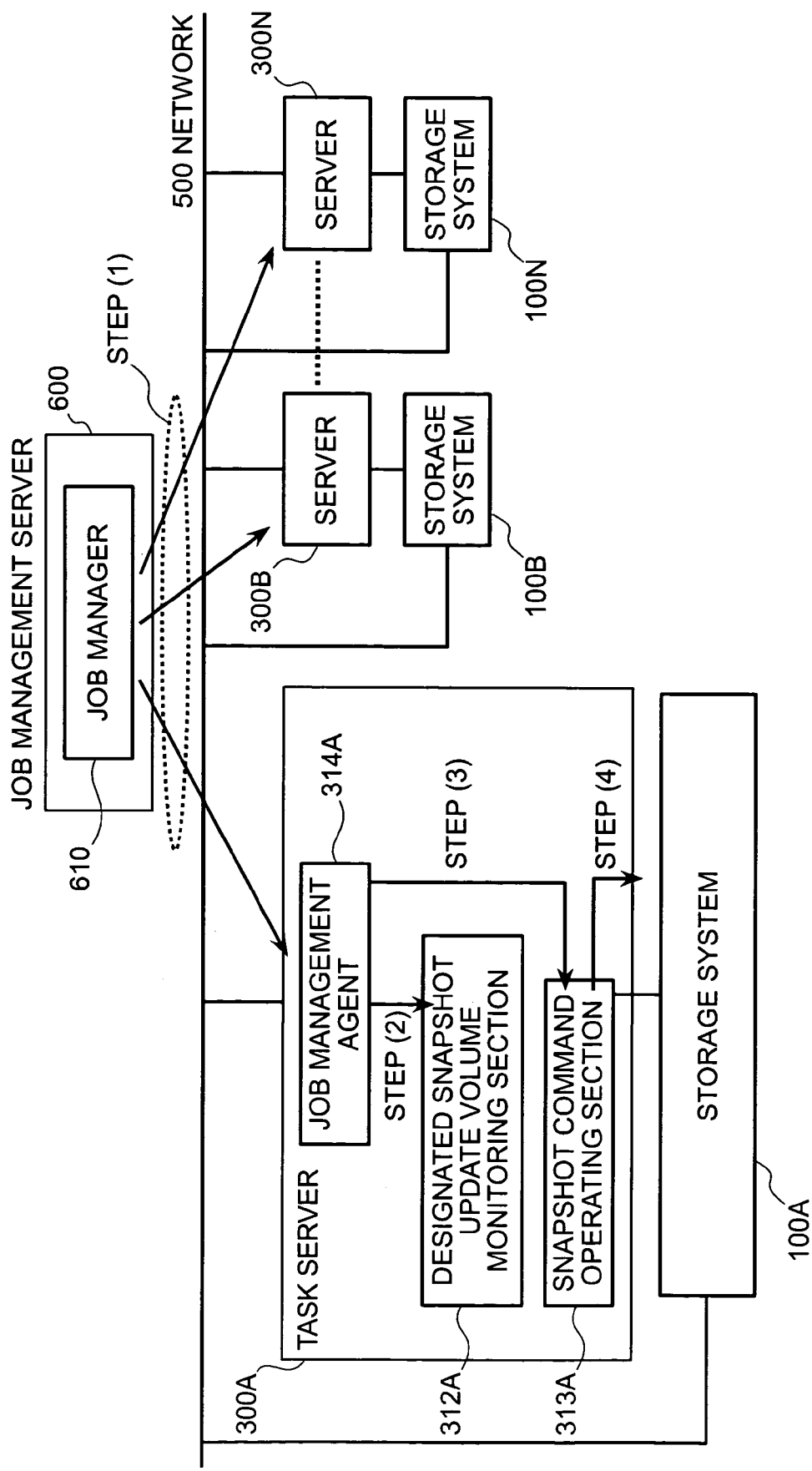
FIG. 10 is a diagram which shows the management of the states of a plurality of snapshots and the automatic issuing of snapshot commands.

FIG. 10 is a diagram showing the management of the states of a plurality of snapshots, and the automatic issuing of snapshot commands. If the present invention is applied to one or a plurality of computer systems, it is possible to automate processing by monitoring the processing status of each snapshot by means of a job management program, and to issue a snapshot command automatically, whenever reports for a previously determined number of generations have been issued.

In FIG. 10, a job management server 600 for managing a plurality of servers 300A, 300B, . . . 300N, is provided. The plurality of servers 300A, 300B, . . . , 300N are respectively connected to storage systems 100A, 100B, . . . 100N. The composition of the servers 300A, 300B, . . . 300N and of the storage systems 100A, 100B, . . . 100N are the same, and, therefore, the following description relates to the server 300A. Firstly, as a preparatory stage, in order to determine that the job management program is valid, a job manager (program) 610 for integrating the overall job management is prepared in the job management server 600. A job management agent (program) 314A is installed in the server 300A carrying out snapshot processing, in order that the processing is actually carried out when an instruction is received from the job manager 610. Furthermore, the number of provisional generation assignment reports issued at which snapshot processing is to be executed, for each of the servers, is also established in the job manager 610.

The job manager 610 in the job management server 600 issues a request to the job management agent 314A of the server 300A, to monitor the number of provisional assignments that have been made, in other words, the number of generations that have been reached (Step 1). The job management agent 314A monitors the reports issued by the designated snapshot volume monitoring section 312A (step 2). If the number of reports thus monitored (in other words, the number of generations which have been provisionally assigned) reaches a previously determined number of generations, then the job management agent 314A sends an instruction for issue of a snapshot command to the snapshot command operating section 313A (Step 3).

It is the snapshot command operating section 313A receiving the instruction in Step 3 that actually issues this command. The subsequent processing corresponds to that shown in FIG. 9. Thereby, it is possible to automate processing by issuing a snapshot command automatically when reports for a previously determined number of generations have been issued.

FIG. 11 is a diagram showing the management items in the designated snapshot update volume managing section. More specifically, FIG. 11 shows the management items that are managed by the designated snapshot update volume managing section 210 in the description provided thus far. The management table 1 contains the value set as a designated update volume, the actual update volume arising as a result of current update processing, the generation currently being processed, and the number of generations which have been assigned as provisional generations. Moreover, the management table 2 manages the status of each generation, namely, the snapshot execution status, and the acquired snapshot volume, for each generation being managed. The details of the statuses indicated in this management table 2 correspond to those illustrated in FIG. 11.

Figure 12:
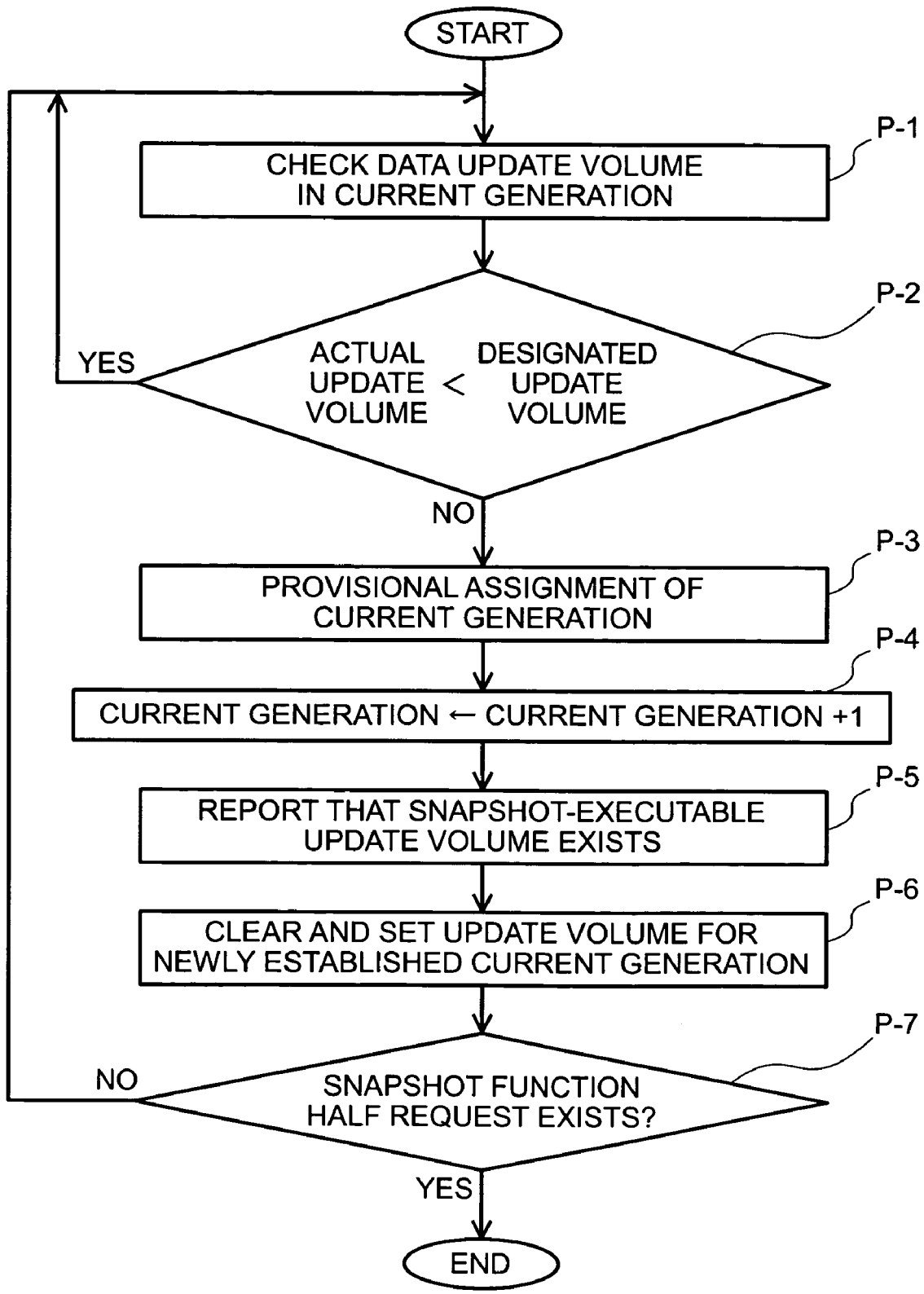
FIG. 12 is a process flow diagram showing a processing sequence for comparing and judging the actual update volume with the designated update volume, as performed by the designated snapshot update volume managing section.
Figure 13:
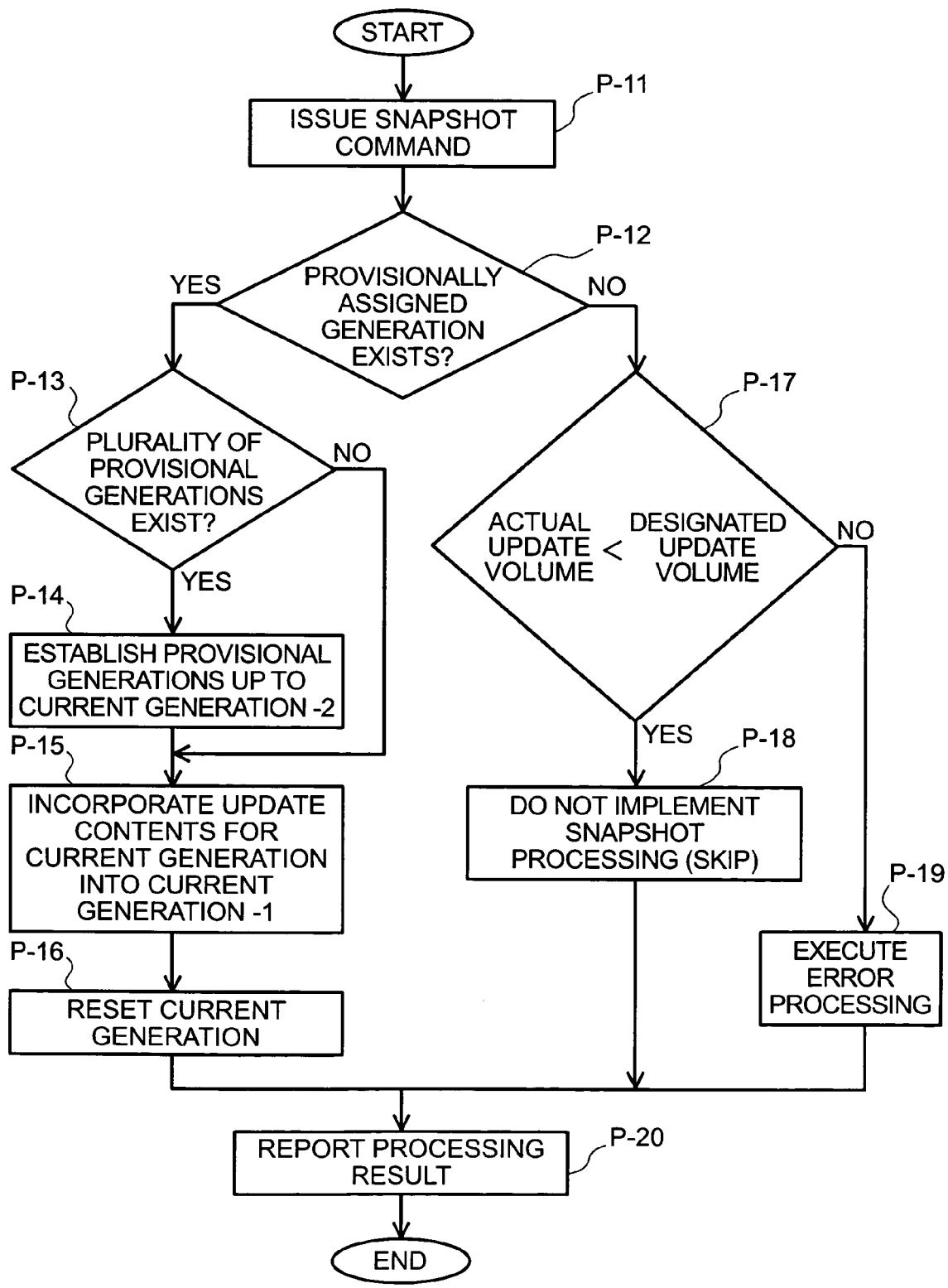
FIG. 13 is a process flow diagram which shows the sequence of processing corresponding to the management status, when snapshot processing is actually implemented.

FIG. 12 and FIG. 13 are flowcharts indicating the characteristic processing of the present invention, in the description provided thus far. FIG. 12 is a diagram showing a processing sequence for comparing and judging the actual update volume with the designated update volume, as performed by the designated snapshot update volume managing section. In FIG. 12, the designated snapshot update volume managing section checks the data update volume in the current generation (process 1, hereinafter referred to as "P-1"), and it compares the "actual update volume" with the "designated update volume" (P-2). If the result of this comparison shows that the "actual update volume" has not reached the "designated update volume" (Yes), then the sequence returns to (P-1).

If the "actual update volume" is equal to or greater than the "designated update volume" (No), then the process, "provisionally assign current generation" (P-3) is carried out, and the processes "increment current generation by +1" and "set as current generation" (P-4) are carried out. Thereupon, "snapshot executable update volume exists" is reported (P-5), and the process "Clear and set update volume in newly established current generation" is carried out (P-6). Thereupon, it is determined whether or not there is a halt request in the snapshot function (P-7). If the answer to this is "Yes", then the processing is terminated; whereas, if the answer is "No", then the processing returns to (P-1).

FIG. 13 shows the sequence of processing corresponding to the management status, when snapshot processing is actually implemented. If a snapshot command is issued (P-11), then it is judged whether or not there is a provisionally assigned generation (P-12). If the answer to this is "provisionally assigned generation exists" (Yes), then it is judged whether or not there are a plurality of provisional generations (P-13). If the answer is "Yes", then the processes "establish provisional generations up to current generation −2" (P-14) and "incorporate update contents of current generation with current generation −1" (P-15) are carried out. If the answer at (P-13) is "No", then the sequence advances to (P-15). After the processing in (P-15), the current generation is reset (P-16), and the processing result is reported (P-20).

Moreover, if the answer is "No" at (P-12), then the actual update volume and the designated update volume are compared (P-17); and, if the actual update volume has not reached the designated update volume (Yes), then no snapshot processing is carried out, in other words, the update is skipped without processing (P-18), and this result is reported (P-20). Thereupon, if it is judged at (P-17) that the actual update volume is equal to or greater than the designated update volume (No), then error processing is carried out (P-19) and this result is reported (P-20).

What is claimed is:

1. A method for acquiring snapshot data in a storage system in such a manner to create a plurality of snapshot generations, said storage system including a plurality of storage devices and a controller which controls operation of said storage system including receiving data from an information processing device and controlling writing and reading of data from and to said storage devices, the method implemented by said controller included in said storage system comprising the steps of:

providing said storage system with a plurality of differential data storage regions, each corresponding to one of the snapshot generations and each storing differential data of a time period corresponding to the one of the snapshot generations, each differential data storage region holding differential data accumulated for the purpose of restoring original data to one or more of said storage devices, from the start of a time period, in place of update data updated to said one or more storage devices during that time period, for at least two or more time periods, said differential data being held in said differential data storage regions corresponds to said time periods;

receiving from said information processing system a snapshot processing command which is used to create a new snapshot generation;

comparing an amount of update data received after the time period of a most recent snapshot generation to a predetermined amount of data to determine whether the amount of update data is equal to or more than the predetermined amount of data;

creating the new snapshot generations if the amount of update data is equal to or more than the predetermined amount of data, thereby executing snapshot processing based on said snapshot processing command; and issuing, in response to the executing of snapshot processing, a report to said information processing device indicating that snapshot processing was executed.

2. The method for acquiring snapshot data according to claim 1, further including the step wherein if the result of the comparing shows that the volume of updated data equals or exceeds the designated data volume, then a judgment is made to execute snapshot processing.

3. The method for acquiring snapshot data according to claim 2, further including the step of executing snapshot processing by designating said differential data accumulated from said start of said time period to be a single generation of differential data, and beginning a new time period for a next generation.

4. The method for acquiring snapshot data according to claim 1, further including the step wherein if the result of the comparing shows that the volume of updated data is less than the designated data volume, then a judgment is made not to execute snapshot processing.

5. The method for acquiring snapshot data according to claim 2, wherein differential data accumulated in excess of the designated volume is incorporated with the differential data accumulated since said start of said time period as a single generation, if the command has not been received when said updated data volume exceeds said designated volume.

6. A storage system having implemented therein a snapshot acquiring system for acquiring snapshot data in the storage system in such a manner to create a plurality of snapshot generations, said storage system including a plurality of storage devices and a controller which controls operation of said storage system including receiving data from an information processing device and controlling writing and reading of data from and to said storage devices, the storage system comprising:
   a plurality of differential storage regions, each corresponding to one of the snapshot generations and each storing differential data of the time period corresponding to the one of the snapshot generations, each differential data storage region holding differential data accumulated for the purpose of restoring original data from the start of a time period in place of update data updated during that time period, for at least two or more time periods, said differential data being held in said differential data storage regions corresponds said time periods;
   means for designating a designated volume of update data at which a next generation of said snapshot data is allowed to be acquired;
   means for judging whether or not snapshot data is to be acquired, by comparing an amount of update data received after the time period of a most recent snapshot generation to a predetermined amount of data to determine whether the amount of update data is equal to or more than the predetermined amount of data; and
   means for provisionally holding said differential data, in one of said differential data storage regions corresponding to a next time period, if the amount of update data is more than the predetermined amount of data.

7. The storage system according to claim 6, further comprising: means for previously designating the designated volume for acquiring a snapshot, wherein the designated volume is designated by a user of one or more of the storage devices to which snapshot processing has been applied.

8. The storage system according to claim 6, wherein when said means for judging is implemented, the storage system acquires the differential data, including differential data provisionally held in the one of said differential data storage regions corresponding to a next time period, as a generation of snapshot data and sets same as a snapshot management object, if the means for judging judges that the update data is equal to or more than the predetermined amount of data.

9. The storage system according to claim 6, wherein said means for judging is implemented in response to a received command for executing snapshot processing, and the storage system does not carry out processing for acquiring snapshot data, if the means for judging judges that the update data is less than the predetermined amount of data.

10. The storage system according to claim 6, wherein when said means for judging is implemented, the differential data held from said start of said time period is processed as one generation and the differential data provisionally held in the one of said differential data storage regions corresponding to the next time period is processed as a next generation if the update data corresponding to the differential data is equal to or more than the predetermined amount of data.

11. A computer system with a snapshot acquiring function, comprising:
   a task server able to communicate with a storage system receiving data from said task server and controlling writing and reading of data from and to said storage devices, receiving data from said task server and controlling writing and reading of data from and to said storage devices, said storage system, being provided with said storage devices, acquires snapshot data from said storage devices in such a manner as to create a plurality of snapshot generations, wherein:
   said task server is provided with a snapshot operating section,
   said data storage system has a plurality of differential storage regions, each corresponding to one of the snapshot generations and each storing differential data of the time period corresponding to the one of the snapshot generations, each differential data storage region holding differential data accumulated for the purpose of restoring original data from the start of a time period in place of update data updated during that time period for at least two or more time periods, said differential data storage regions correspond to said time periods, a snapshot control device, a snapshot command control section, a designated snapshot update volume managing section, and a designated snapshot update volume reporting section,
   said task server sends a snapshot processing command, which is used to create a new snapshot generation to said storage system,
   said storage system compares an amount of update data received after the time period of a most recent snapshot generation, and
   if the amount of update data is equal to or more than the predetermined amount of data, then snapshot processing according to the snapshot processing command is executed and said storage system sends a report to the snapshot operating section indicating whether snapshot processing was executed.

12. The computer system with a snapshot acquiring function according to claim 11, further comprising:
   a plurality of said task servers, said task servers being connected by a network; and
   a job management server having a job manager, for managing the jobs of said plurality of task servers, said job management server also being connected to said network;
   wherein each of said task servers has a job management agent for implementing a snapshot of that task server, upon an instruction from said job manager.

13. The computer system with a snapshot acquiring function according to claim 11, wherein said snapshot operating section has a designated snapshot update volume registering section, a designated snapshot update volume monitoring section, and a snapshot command operating section.

14. The computer system with a snapshot acquiring function according to claim 11, wherein said differential data storage region has differential data storage areas for a plurality of generations.

15. The computer system with a snapshot acquiring function according to claim 11, wherein said task server and said data storage system are connected via a SCSI, fiber channel and SAN connection interface.

16. The computer system with a snapshot acquiring function according to claim 12, wherein said snapshot operating section has a designated snapshot update volume registering section, a designated snapshot update volume monitoring section, and a snapshot command operating section.

17. The computer system with a snapshot acquiring function according to claim 12, wherein each differential data storage region stored one of a plurality of snapshot generations.

18. The computer system with a snapshot acquiring function according to claim 12, wherein said task servers and said data storage system are connected via a SCSI, fiber channel and SAN connection interface.

* * * * *